United States Patent [19]
Hugo

[11] Patent Number: 6,017,981
[45] Date of Patent: Jan. 25, 2000

[54] COATING MATERIAL WITH REFLECTIVE PROPERTIES IN TWO WAVELENGTH RANGES, AND ABSORBENT PROPERTIES IN A THIRD WAVELENGTH RANGE

[76] Inventor: Gerd Hugo, Schondorf, Germany

[21] Appl. No.: 08/875,121

[22] PCT Filed: Jan. 11, 1996

[86] PCT No.: PCT/DE96/00069

§ 371 Date: Sep. 17, 1998

§ 102(e) Date: Sep. 17, 1998

[87] PCT Pub. No.: WO96/22337

PCT Pub. Date: Jul. 25, 1996

[30] Foreign Application Priority Data

Jan. 17, 1995 [DE] Germany .............................. 195 01 114

[51] Int. Cl.[7] ....................................................... C08K 3/00
[52] U.S. Cl. .......................... 523/216; 523/172; 523/200; 523/210; 524/439; 524/440; 524/441; 524/418; 524/420; 524/430
[58] Field of Search ..................................... 523/172, 200, 523/210, 216; 524/439, 440, 441, 418, 420, 430

[56] References Cited

U.S. PATENT DOCUMENTS 4,916,014 4/1990 Weber et al. ............................ 428/403

FOREIGN PATENT DOCUMENTS

| | | |
|---|---|---|
| 1 227 594 | 10/1966 | Germany . |
| 2 056 211 | 5/1972 | Germany . |
| 3 432 998 | 5/1986 | Germany . |
| 4 418 215 | 11/1995 | Germany . |
| 1 074 891 | 7/1967 | United Kingdom . |

*Primary Examiner*—Edward J. Cain
*Attorney, Agent, or Firm*—Michael L. Dunn

[57] ABSTRACT

A coating material having reflective properties in two wavelength ranges and absorbent properties in a third wavelength range. The coating material comprises a binder, flaky first particles, and second particles. The binder has a transparency greater than 40% in the wavelength ranges of from 0.4 to 0.7 μm and from 10 to 50 μm and a refractive index n in the wavelength ranges less than 2.0. The coating material comprises from 20 to 30 percent by weight, based on the wet weight of the coating material, of the flaky first particles. The flaky first particles have a thickness less than 10 μm and a surface area (length×width) greater than 100 μm² and a reflectivity R greater than 40% in the wavelength range of from 10 to 50 μm. The second particles at least partially overlap the first particles. The second particles have a transparency greater than 40% only in the wavelength ranges of from 0.4 to 0.7 μm and from 10 to 50 μm, but an absorption greater than 20% in the wavelength range of from 1.0 to 2.0 μm, as well as a refractive index in the wavelength range of from 0.4 to 0.7 μm greater than that of the binder. The size of the second particles are selected such that there is an optimum back scattering and thus reflective effect in the wavelength range of from 0.4 to 0.7 μm.

52 Claims, No Drawings

COATING MATERIAL WITH REFLECTIVE PROPERTIES IN TWO WAVELENGTH RANGES, AND ABSORBENT PROPERTIES IN A THIRD WAVELENGTH RANGE

Known coating materials such as, for example, wall paints for the interior of houses, are composed of binders, pigments and different additives. In most cases, white wall paints are preferred in order to take advantage of the light reflection off the walls.

In addition to the reflection of the light in the room produced by means of the light-coloured walls, it would be desirable in winter to reflect the heat radiation emitted from objects in the room and from the inside walls of the house, and from the people in the room, back onto the insides of the external walls of the room. At a temperature of 20° Celsius, the internal wall of a house radiates heat energy of $$M = \epsilon \cdot \sigma \cdot T^4 = 397 Mm^{-2}$$

Here, $\epsilon$ is the degree of surface emission, $\sigma$ is the Stefan Boltzmann constant, with $5.67 \times 10^{-8}$, and T is the surface temperature in Kelvin. According to Wien's law, the wavelength associated with this temperature is 9.89 $\mu$m, which is a wavelength in the heat infrared range. This means that the wall radiates a maximum radiation of 9.89 $\mu$m in accordance with Planck's law of radiation. Only approximately 5% of this heat radiation is reflected from the opposite, internal side of the external wall, as the coating materials used in the home are highly absorbent of heat radiation in the wavelength of 5 to 100 $\mu$m. The remaining 95% is transported to the outside by the heat conduction of the wall and is lost to the room.

When the sun shines in winter, because of the low position of the sun at this time of year, the solar radiation can, for example, strike an internal wall through a south-facing window of the house and be absorbed in accordance with the reflective properties of the wall paint in the spectral range of solar radiation of 0.3 to 2.5 $\mu$m, and correspondingly converted into heat.

In normal wall paints pigments are nevertheless used which also reflect in the near infra-red range of 0.8 to 2.5 $\mu$m, beyond the visible range of the solar spectrum, and therefore reflect back a large part of the solar energy in this wavelength range, like the "white" colours in the visible range. Moreover, the pigments and binders used in the normal paints have strong absorbtion bands in the heat infra-red range, that is to say in the heat radiation range. Up to 95% of the heat which could be obtained from the solar irradiation is immediately given off as heat radiation.

Although this heat is present in the room, the room is only warm when the sun shines. Because of the low energy yield in the near infra-red range and also in particular because of the immediate 95% heat emission from the surface, no energy gains can be stored for the following night.

A similar situation applies for the external sides of the house walls. Optically perceived white and pale paint colours are mainly used, more for the sake of appearance. As the pigmentation is similar to the interior paints, they also have high reflectivity in the near infra-red spectrum of sunlight. As with interior wall paints, the reflectivity of the exterior wall paints is low in the thermal infra-red range, that is to say in the heat radiation range.

Because of the strong absorbtion bands in this wavelength range, of the binders and pigments normally used, 95% of that which could be converted in the wall paint into heat from the sunlight is given off again.

The object of the present invention is to positively include the direct and diffuse sunshine also available in winter in the thermal balance of a house by simple means while still permitting aesthetic views in the colour design of house walls such as, for example, pale colours, to be considered in the normal manner.

This object is solved by the features of claim 1.

The invention relates to a coating material which can be made such that it is reflective in the visible range of the electromagnetic spectrum of 0.4 to 0.7 $\mu$m and absorbent in the near infra-red range of 0.75 to 2.5 $\mu$m. The coating material has a high reflectivity, with a low degree of absorbtion, in the thermal infra-red range of 3 to 100$\mu$m, in particular of 5 to 50 $\mu$m, that is to say in the wavelength range in which surfaces with temperatures of 0 to 30° Celsius have their maximum radiation. This means that in this wavelength range it also has a low heat emissivity.

For this, in order to produce white, bright coating materials in the visible range, pigments are selected which are transparent in the visible range and have a higher refraction than the binder, which consequently produce a high backscatter in the visible, and are thereby white and bright.

in the near infra-red range of 0.75 to 2.5 $\mu$m, the pigments selected are more or less absorbent, and in the heat infra-red range, particularly in the range of 5 to 50 $\mu$m, the pigments are again mainly transparent, so heat radiation is hardly absorbed by them at all. In the following section of the description these pigments are designated as second particles in order to better differentiate them from the other additives.

In order to obtain a reflectivity in the thermal infra-red range of 5 to 50 $\mu$m, flaky pigments are added to the binder, the reflective power R of which, according to the formula $$R = \frac{(n-1)^2 + k^2}{(n+1)^2 + k^2}$$

is greater than 40%, in particular greater than 60%. Here, n is the refractive index of the pigment and k is the absorbtion coefficient. Hereinafter in the description, for clarity, these pigments will be designated as first particles.

The reflectivity of these pigments is broad banded, that is to say they reflect in the visible as well as in the near infra-red and heat infra-red ranges. Nevertheless, only their reflectivity in the heat infra-red range is desired, and in the visible range it should show as near to nothing as possible.

This is obtained on the one hand by the direct coating of the second particles on the first particles or by free coating in the binder. Moreover, it has proved advantageous to select the size of the flakes of the first particles to be as large as possible as they then contribute less to the greying of the perceived colour.

The desired absorbency of the coating material in the near infra-red range of 0.75 to 2.5 $\mu$m, that is to say beyond the visible wavelength range, is brought about on the one hand by the second particles themselves, and on the other hand by further particles which are for tinting the coating material.

The further particles are selected so that they are spectrally selective in the visible range and only reflective when there are discrete colours, that is to say, for example red, green or blue, and so that they are highly absorbent in the near infra-red range and have a high transparency in the heat infra-red range in order to affect the reflectivity if the first particles in this range as little as possible.

The selection of the binder in which the said pigments are dispersed depends on the surface to be treated. Essentially, the binder must however have high transparency in the visible and in the heat infra-red range in order to allow a backscattering or reflective action of the coating material in these wavelength ranges. In the near infra-red range it is advantageous when the binder has absorbtion bands.

For wall surfaces, dispersion binders have proved advantageous as they actively breathe. In particular, mixtures of polyethylene-based dispersions and also of polyethylene oxides with small amounts of acrylic dispersions are suitable for the coating material according to the invention.

For metal surfaces, such as the inside and outside of metal window frames, and also metal facades and metal constructions, for example, for conservatories, binders containing solvents are more suitable, such as, for example, cyclized rubber and hydrated hydrocarbon resins, wherein the latter is preferably used only internally.

An advantageous further development of the concept of the invention is provided in that the first particles are selected from the metals group such as, for example, aluminium, copper, silver, gold, nickel, zinc, iron, from alloys of the metals such as, for example, stainless steel, brass, bronze, from the semi-conductor group such as, for example, silicon, germanium, or from the doped semi-conductor group such as, for example, doped silicon.

A further advantageous development of the concept of the invention is provided in that the first particles are electrically conductive and are coated with a further electrically conductive thin layer for increasing chemical resistivity and for increasing the degree of glossiness.

An advantageous further development of the concept of the invention is provided in that the first particles are electrically conductive and are coated with a non electrically conductive thin layer for providing colour.

An advantageous further development of the concept of the invention is provided in that the first particles are composed of a non electrically conductive material such as, for example, plastics flakes or mica plates, which are covered with an electrically conductive coating, for example of doped tin oxide, indium tin oxide or antimony oxide.

An advantageous further development of the concept of the invention is provided in that the second particles are metal sulphides such as, for example, lead sulphide and zinc sulphide, metal selenides such as, for example, zinc selenide, chlorides such as, for example, sodium and potassium chloride, fluorides such as, for example, calcium fluoride, lithium fluoride, barium fluoride and sodium fluoride, antimonides such as, for example, indium antimonide, from metal oxides such as, for example, magnesium oxide, antimony oxide and zinc oxide, from barium titanate, from barium ferrite, from pure calcium sulphate $CaSO_4$, from precipitated barium sulphate and from blended crystals of barium sulphate with zinc sulphide such as lithopone.

An advantageous further development of the concept of the invention is provided in that when the second particles are selected from the inorganic colour pigment group they are metal oxides such as, for example, iron oxides, in particular transparent iron oxides, red oxides and yellow oxides such as, for example, BASF sicotrans formulations, Bayer α-iron oxides, iron oxide black pigments such as, for example, pigment black 11, chromium oxides such as, for example, chromium oxide green, lead oxides such as, for example, red lead, molybdenum oxides, mixed metal oxides and iron blue pigments such as, for example, Degussa's vossen blue, based on microcrystalline Fe(II) Fe(III) cyanide complexes, and when they are selected from the organic pigment group they are disazo pigments, indigo pigments, in particular thioindigo derivatives such as, for example 7.7' dichlorthioindigo and phthalocyanine.

An advantageous further development of the concept of the invention is provided in that the binder is a solvent-containing binder, a water lacquer or an aqueous dispersion and can be a cyclized rubber, chlorine rubber, butyl rubber, hydrocarbon resin, α-methylstyrene-acrylonitrile copolymer, polyester amide, acrylic resin based on butyl acrylate, polyacrylate, in particular butyl polyacrylates, an aqueous dispersion based on polyethylene oxide, an aqueous dispersion based on ethylene acrylic acid copolymers, an aqueous dispersion based on methacrylate, based on acrylate-styrene, a vinylpyrrolidine vinylacetate copolymer, an atactic polyisopropyl acrylate, a polyvinylpyrrolidine or a mixture of the dispersions described and lacquer.

The subject-matter of the invention will hereinafter be described in more detail with reference to examples and within the framework of experiments.

The effect of the coating material according to the invention will be demonstrated on an internal wall opposite a south-facing window.

A dispersion mixture composed of:

| | |
|---|---|
| 200 g | polyethylene dispersion with 40% solids |
| 200 g | polyethylene oxide with 40% solids |
| 20 g | acrylic dispersion with 40% solids |
| 2 g | antifoaming agent |
| 30 g | thickener |
| 240 g | water |
| 200 g | zinc sulphide |
| 200 g | zinc oxide |
| 5 g | chromium oxide green |
| 80 g | flaky aluminium bronze |

The mixture produced a lime green, bright wall paint with which a part of the wall was painted. After drying of the paint, the surface temperatures on the untreated parts of the wall and on the painted parts were measured after solar irradiation. Despite the heat conductivity into the wall, those parts of the wall which were painted with the paint according to the invention were 15° warmer than the others.

The same experiment was repeated with a different composition. Instead of chromium dioxide green, a Bayer ce-iron red oxide was used, and instead of the aluminium bronze, doped silicon particles were used. The mixture produced a bright colour with a light red tint. After solar irradiation, a temperature increase of 12° Celsius compared to the untreated wall areas was measurable.

The same colour was painted on the inside of an external wall. At night, it was determined by means of a thermal imaging camera, that at this place less heat escaped to outside the house.

In a further experiment on a south facing external wall of the house, the zinc sulphide and zinc oxide pigments used as the second particles were replaced with the same amount of lithopone. The amount of acrylic in the mixture was increased slightly. A zinc flake with a flake size of approximately 10000 $\mu m^2$ was used as the first particle, having reflectivity for the heat infra-red range. The mixture was not tinted and produced a bright, refracted white. The temperature increase at the place painted with the paint according to the invention was 11° Celsius compared to the untreated place.

A small amount of calcium sulphate and barium ferrite was added to the same mixture. The absorbtion in the near infra-red range of the solar spectrum could in this way be significantly increased although the perceived colour was almost white in the visual optical range.

At night it could be observed with a thermal imaging camera that at those places on the house which were painted with the paint according to the invention, significantly less heat was radiated outwards than at the untreated places.

The aluminium frame of one of two south facing windows was painted externally with a cyclized rubber based gloss paint which comprised, in addition to zinc oxide based second particles, small quantities of an iron oxide black pigment as further particles, and stainless steel flakes as first particles, and an infra-red transparent softener. The inside of the window frame was painted with a gloss paint based on a hydrated hydrocarbon resin.

Lithopone was used for the second particles, silver coated nickel flakes for first particles, and transparent iron oxide was used for further particles for tinting the paint.

During the day energy gains were mainly conducted to the inside from the near infra-red range of the solar spectrum. At night it could be observed with a thermal imaging camera, that the window frame painted with the coating material according to the invention radiated less heat to the outside than the untreated one.

Further Prior Art

A coating is described in U.S. Pat. No. 4, 916,014 which has reflective properties in two wavelength ranges. However, it is disadvantageous with respect to the object of the invention disclosed here, that in addition to a high reflectivity in the visible light range, there should be reflectivity in the near infra-red range of the solar spectrum, in order to prevent heating of the building painted with said coating.

An infra-red reflective, fire-resistant protective coating is described in DE 1 227 594, which is highly reflective in at least the near infra-red wavelength range. It is disadvantageous, however, with respect to the object of the invention disclosed here, that the coating is reflective in the near infra-red range, but is absorbent in the heat infra-red range above the wavelength of 10 $\mu m$ because of the materials selected, and therefore has an emissive effect.

I claim:

1. Coating material having reflective properties in two wavelength ranges and absorbent properties in a third wavelength range, comprising:
    a) a binder having transparency greater than 40% in the wavelength ranges of from 0.4 to 0.7 $\mu m$ and from 10 to 50 $\mu m$ and a refractive index n in the said wavelength ranges less than 2.0;
    b) 20 to 30 percent by weight, based on the wet weight of the coating material, of flaky first particles having a thickness less than 10 $\mu m$ and a surface area (length×width) greater than 100 $\mu m^2$ and a reflectivity R greater than 40% in the wavelength range of from 10 to 50 $\mu m$; and
    c) second particles at least partially overlapping the first particles, which second particles have a transparency greater than 40% only in the wavelength ranges of from 0.4 to 0.7 $\mu m$ and from 10 to 50 $\mu m$, but an absorption greater than 20% in the wavelength range of from 1.0 to 2.0 $\mu m$, as well as a refractive index in the wavelength range of from 0.4 to 0.7 $\mu m$ greater than that of the binder
the size of the second particles being selected such that there is an optimum back scattering and thus reflective effect in the wavelength range of from 0.4 to 0.7 $\mu m$.

2. Coating material of claim 1 comprising a binder a) having a transparency greater than 60% in the wavelength ranges of from 0.4 to 0.7 $\mu m$ and of from 10 to 50 $\mu m$.

3. Coating material of claim 1 comprising a binder having a transparency greater than 40% in the wavelength ranges of from 0.38 to 0.75 $\mu m$ and 5 to 100 $\mu m$.

4. Coating material of claim 2 comprising a binder having a transparency greater than 60% in the wavelength ranges of from 0.38 to 0.75 $\mu m$ and from 5 to 100 $\mu m$.

5. Coating material of claim 1 comprising a binder having a refractive index n in the said wavelength ranges less than 1.7.

6. Coating material of claim 5 comprising a binder having a refractive index n of about 1.5.

7. Coating material of claim 1 comprising flaky first particles b) having a thickness less than 5$\mu m$.

8. Coating material of claim 1 comprising flaky first particles b) having a surface area (length×width) greater than 2,500 $\mu m^2$.

9. Coating material of claim 8 comprising flaky first particles b) having a surface area (length×width) greater than 10,000 $\mu m^2$.

10. Coating material of claim 1 comprising flaky first particles b) having a reflectivity R greater than 40% in the wavelength range of from 5 to 100 $\mu m$.

11. Coating material of claim 1 comprising flaky first particles b) having a reflectivity R greater than 60% in the wavelength range of from 10 to 50 $\mu m$.

12. Coating material of claim 10 comprising flaky first particles b) having a reflectivity R greater than 60% in the wavelength range of from 5 to 100 $\mu m$.

13. Coating material of claim 1 comprising second particles c) having transparency greater than 40% in the wavelength ranges of from 0.38 to 0.75 $\mu m$ and from 5 to 100 $\mu m$.

14. Coating material of claim 1 comprising second particles c) having transparency greater than 60% in the wavelength ranges of from 0.4 to 0.7 $\mu m$ and from 10 to 50 $\mu m$.

15. Coating material of claim 13 comprising second particles c) having a transparency greater than 60% in the wavelength ranges of from 0.38 to 0.75 $\mu m$ and from 10 to 100 $\mu m$.

16. Coating material of claim 1 comprising second particles c) having an absorption greater than 40% in the wavelength range of 1.0 to 2.0 $\mu m$.

17. Coating material of claim 1 comprising second particles c) having an absorption greater than 20% in the wavelength range of from 0.8 to 2.5 $\mu m$.

18. Coating material of claim 16 comprising second particles c) having an absorption greater than 40% in the wavelength range of from 0.8 to 2.5 $\mu m$.

19. Coating material of claim 1 comprising second particles c) having a refractive index greater than that of the binder in the wavelength range of from 0.38 to 0.75 $\mu m$.

20. Coating material of claim 1 comprising additionally:
    d) further particles having a transparency greater than 40% in the wavelength range of from 10 to 50 $\mu m$ and which in the wavelength range of from 0.4 to 0.7 $\mu m$ are selectively reflective in discrete ranges of the visible light and have an absorption greater than 20% in the wavelength range of from 1.0 to 2.0 $\mu m$.

21. Coating material according to claim 20 comprising further particles d) having a transparency greater than 40% in the wavelength range of from 5 to 100 $\mu m$.

22. Coating material of claim 20 comprising further particles d) having a transparency greater than 60% in the wavelength range of from 10 to 50 $\mu m$.

23. Coating material of claim 21 comprising further particles d) having a transparency greater than 60% in the wavelength range of from 5 to 100 $\mu m$.

24. Coating material of claim 20 comprising further particles d) which in the wavelength range of from 0.38 to 0.75 $\mu m$ are selectively reflective in discrete ranges of the visible light.

25. Coating material of claim 20 comprising further particles d) having an absorption greater than 20% in the wavelength range of from 0.8 to 2.5 $\mu m$.

26. Coating material of claim 20 comprising further particles d) having an absorption greater than 40% in the wavelength range of from 1.0 to 2.0 μm.

27. Coating material of claim 25 comprising further particles d) having absorption greater than 40% in the wavelength range of from 0.8 to 2.5 μm.

28. Coating material of claim 1 wherein the second particles are added directly to the binder.

29. Coating material of claim 1, wherein the second particles are applied to the first particles.

30. Coating material of claim 1, wherein the first particles comprise an element selected from the group consisting of aluminum, copper, silver, gold, nickel, zinc, iron, silicon, germanium, and mixtures and alloys thereof.

31. Coating material of claim 1, wherein the first particles are electrically conductive and are coated with a further electrically conductive thin layer for increasing chemical resistivity and for increasing gloss.

32. Coating material of claim 2, wherein the first particles are electrically conductive and are coated with a further electrically conductive thin layer for increasing chemical resistivity and for increasing gloss.

33. Coating material of claim 28, wherein the first particles are electrically conductive and are coated with a further electrically conductive thin layer for increasing chemical resistivity and for increasing gloss.

34. Coating material of claim 29, wherein the first particles are electrically conductive and are coated with a further electrically conductive thin layer for increasing chemical resistivity and for increasing gloss.

35. Coating material of claim 30, wherein the first particles are electrically conductive and are coated with a further electrically conductive thin layer for increasing chemical resistivity and for increasing gloss.

36. Coating material of claim 1, wherein the first particles are electrically conductive and are coated with a non-electrically conductive thin layer which provides color.

37. Coating material of claim 2, wherein the first particles are electrically conductive and are coated with a non-electrically conductive thin layer which provides color.

38. Coating material of claim 28, wherein the first particles are electrically conductive and are coated with a non-electrically conductive thin layer which provides color.

39. Coating material of claim 29, wherein the first particles are electrically conductive and are coated with a non-electrically conductive thin layer which provides color.

40. Coating material of claim 30, wherein the first particles are electrically conductive and are coated with a non-electrically conductive thin layer which provides color.

41. Coating material of claim 1, wherein the first particles are composed of a non-electrically conductive material covered with an electrically conductive coating.

42. Coating material of claim 2, wherein the first particles are composed of a non-electrically conductive material covered with an electrically conductive coating.

43. Coating material of claim 28, wherein the first particles are composed of a non-electrically conductive material covered with an electrically conductive coating.

44. Coating material of claim 29, wherein the first particles are composed of a non-electrically conductive material covered with an electrically conductive coating.

45. Coating material of claim 30, wherein the first particles are composed of a non-electrically conductive material covered with an electrically conductive coating.

46. Coating material of claim 1, wherein the second particles are selected from the group consisting of metal sulphides; metal selenides; Group I metal chlorides; Group I metal fluorides; Group II metal fluorides; antimonides; metal oxides; barium titanate; barium ferrite; pure calcium sulphate $CaSO_4$; precipitated barium sulphate and blended crystals of barium sulphate with zinc sulphide.

47. Coating material of claim 2, wherein the second particles are selected from the group consisting of metal sulphides; metal selenides; Group I metal chlorides; Group I metal fluorides; Group II metal fluorides; antimonides; metal oxides; barium titanate; barium ferrite; pure calcium sulphate $CaSO_4$; precipitated barium sulphate and blended crystals of barium sulphate with zinc sulphide.

48. Coating material of claim 28, wherein the second particles are selected from the group consisting of metal sulphides; metal selenides; Group I metal chlorides; Group I metal fluorides; Group II metal fluorides; antimonides; metal oxides; barium titanate; barium ferrite; pure calcium sulphate $CaSO_4$; precipitated barium sulphate and blended crystals of barium sulphate with zinc sulphide.

49. Coating material of claim 20, wherein the further particles are inorganic colour metal oxide pigments selected from the group consisting of transparent iron oxides; red iron oxides; yellow iron oxides; α-iron oxides, iron oxide black pigments; chromium oxide green; red lead oxide; molybdenum oxides; mixed metal oxides; and iron blue pigments based on microcrystalline FE(II) FE(III) cyanide complexes.

50. Coating material of claim 20 wherein the further particles are selected from the group consisting of the disazo pigments, indigo pigments, thioindigo pigments and phthalocyanine.

51. Coating material of claim 1 wherein the binder is a solvent based binder selected from the group consisting of cyclized rubber, chlorine rubber, butyl rubber, hydrocarbon resin, αmethylstyrene-acrylonitrile copolymer, polyester amide polymer and acrylic resin based on butyl acrylate.

52. Coating material of claim 1 wherein the binder is an aqueous solution or dispersion selected from the group consisting of polyethylene, polyethylene oxide, ethylene acrylic acid copolymers, methacrylate polymers, acrylate styrene polymers, vinyl pyrrolidine-vinyl acetate copolymers, atactic polyisopropyl acrylate polymers, polyvinyl pyrrolidine polymers and mixtures thereof.

* * * * *